(12) United States Patent
Rao et al.

(10) Patent No.: US 7,256,965 B2
(45) Date of Patent: Aug. 14, 2007

(54) ADAPTABLE AIR BEARING SLIDER WITH TRAILING EDGE CAVITY

(75) Inventors: Ram M. Rao, Shoreview, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 566 days.

(21) Appl. No.: 10/607,807

(22) Filed: Jun. 27, 2003

(65) Prior Publication Data

US 2004/0201923 A1  Oct. 14, 2004

Related U.S. Application Data

(60) Provisional application No. 60/461,848, filed on Apr. 10, 2003.

(51) Int. Cl.
*G11B 5/60* (2006.01)
(52) U.S. Cl. .................. 360/235.7; 360/235.8
(58) Field of Classification Search ............ 360/235.7, 360/235.5, 235.8, 234.7, 236.3, 236.5, 237
See application file for complete search history.

(56) References Cited

U.S. PATENT DOCUMENTS

| | | | | |
|---|---|---|---|---|
| 5,587,858 | A | 12/1996 | Dorius et al. ............ 360/103 |
| 5,721,650 | A | 2/1998 | Crane et al. ............. 360/103 |
| 5,737,151 | A | 4/1998 | Bolasna et al. .......... 360/103 |
| 5,831,792 | A | 11/1998 | Ananth .................... 360/103 |
| 5,894,379 | A | 4/1999 | Koishi et al. ............ 360/103 |
| 6,040,965 | A * | 3/2000 | Terunuma et al. ....... 360/122 |
| 6,069,769 | A * | 5/2000 | Dorius et al. ........... 360/235.6 |
| 6,137,656 | A * | 10/2000 | Levi et al. ............... 360/235.4 |
| 6,144,528 | A | 11/2000 | Anaya-Dufresne et al. ...................... 360/235.4 |
| 6,188,547 | B1 | 2/2001 | Gui et al. |
| 6,212,040 | B1 | 4/2001 | Hungerford ............. 360/221 |
| 6,344,949 | B1 * | 2/2002 | Albrecht et al. ......... 360/236.5 |
| 6,445,543 | B1 * | 9/2002 | Gui et al. ................ 360/236.6 |
| 6,678,119 | B1 * | 1/2004 | Pendray et al. .......... 360/236.6 |
| 6,680,821 | B2 * | 1/2004 | Kang ...................... 360/236.2 |
| 6,738,227 | B2 * | 5/2004 | Jang et al. .............. 360/236.3 |
| 6,839,203 | B2 * | 1/2005 | Ueda et al. ............. 360/235.8 |
| 6,920,016 | B2 * | 7/2005 | Yamakura et al. ....... 360/235.7 |
| 6,937,440 | B2 * | 8/2005 | Rajakumar et al. ...... 360/236.2 |
| 2002/0041467 | A1 | 4/2002 | Boutaghou et al. |

FOREIGN PATENT DOCUMENTS

EP    0 938 081 A2    2/1999

OTHER PUBLICATIONS

U.S. Appl. No. 10/376,864, entitled "Disc Head Slider With Bearing Pad Design", filed Aug. 6, 2002.
U.S. Appl. No. 10/295,530, entitled "An Air Bearing for a Head to Provide Reduced Cross-Curve Sensitivity", filed Nov. 15, 2002.

* cited by examiner

*Primary Examiner*—Angel Castro
(74) *Attorney, Agent, or Firm*—Westman, Champlin & Kelly, P.A.

(57) ABSTRACT

An air bearing slider including a recessed cavity surface to provide an adaptable bearing surface to compensate for thermal expansion or pole tip protrusion. The recessed cavity surface forms a leading edge cavity step to a raised bearing surface proximate to a trailing edge of the slider. The leading edge cavity step forms a rampless air bearing surface proximate to the trailing edge of the slider which is adaptable to form a ramp to pressurize a protruding surface of a transducer portion of the head.

20 Claims, 12 Drawing Sheets

PRIOR ART

ADAPTABLE AIR BEARING SLIDER WITH TRAILING EDGE CAVITY

CROSS-REFERENCE TO RELATED APPLICATION

This application claims priority from U.S. Provisional Application 60/461,848 filed on Apr. 10, 2003 for inventors Ram M. Rao and Zine-Eddine Boutaghou and entitled AIR BEARING DESIGN WITH IMPROVED STICTION PERFORMANCE, CROSS-CURVE SENSITIVITY AND TPTR COMPENSATION.

FIELD OF THE INVENTION

The present invention relates generally to data storage devices, and more particularly but not by limitation to an air bearing slider for a data storage device.

BACKGROUND OF THE INVENTION

Data storage devices store digitally encoded information on discs. Heads read data from or write data to discs which are supported for rotation relative to a base chassis by a spindle motor or drive. Heads include transducer elements, such as magnetoresistive, magneto-optical or inductive elements for read or write operations. An actuator assembly moves the head relative to select data tracks on the disc for read or write operations.

Typically the head includes an air bearing slider which is coupled to a head suspension assembly. Rotation of the disc creates an air flow along the air bearing slider to provide a lift force. The lift force of the air bearing slider is countered by a load force supplied via a load beam of the suspension assembly to define in part a fly height of the slider. The slider is coupled to the head suspension assembly via a gimbal spring so that the slider pitches and rolls to follow the topography of the disc surface. Typically the slider flies at a pitch angle so that a trailing edge of the slider defines a close point of the slider relative to the disc surface. During operation, the air bearing compensates for shock or vibration to maintain a stable fly height for the slider above the disc surface.

The transducer elements of the head are fabricated on the trailing edge of the slider. Typically the transducer elements are embedded in a thermally expandable substrate or body such as Alumina $Al_2O_3$. Thermal expansion of the transducer portion via changes in ambient drive temperature or via heat generated by write current can cause transducer elements to protrude (i.e. pole tip protrusion) below air bearing surfaces of the slider. Protrusion of the transducer elements or pole tip protrusion can compromise effect of the air bearing to maintain a stable fly height between the slider and the disc surface. Embodiments of the present invention provide solutions to these and other problems, and offer other advantages over the prior art.

SUMMARY OF THE INVENTION

The present invention relates to an air bearing slider including an adaptable bearing surface to compensate for thermal expansion of the transducer or pole tip protrusion. The bearing surface includes a leading edge cavity step from a recessed cavity surface, below a stepped bearing surface, to the raised bearing surface proximate to a trailing edge of the slider. The leading edge cavity step forms a rampless air bearing surface proximate to the trailing edge of the slider which is adaptable to form a ramp to pressurize a protruding surface of a transducer portion of the head. Other features and benefits that characterize embodiments of the present invention will be apparent upon reading the following detailed description and review of the associated drawings.

BRIEF DESCRIPTION OF THE DRAWINGS

FIGS. 2 and 2-1 schematically illustrate expansion of a transducer portion or pole tip protrusion for a head.

FIGS. 3, 3-1 and 3-2 schematically illustrate a stepped bearing surface or channel of a prior art air bearing slider.

FIGS. 4, 4-1 and 4-2 schematically illustrate an embodiment of a recessed cavity step or channel to provide an adaptable air bearing slider of the present invention.

DETAILED DESCRIPTION OF ILLUSTRATIVE EMBODIMENTS

Figure 1:
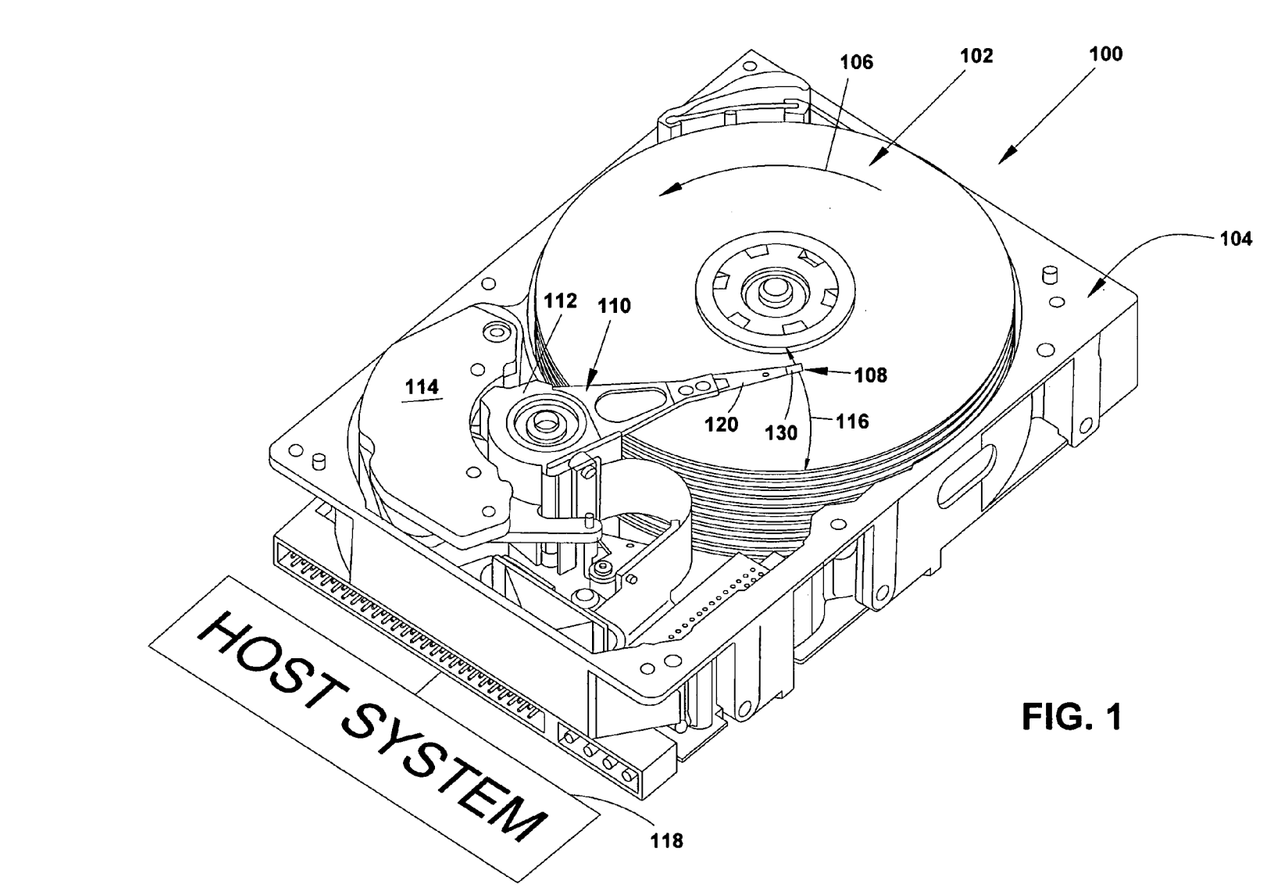
FIG. 1 is a perspective illustration of a data storage device.

FIG. 1 is a perspective illustration of a data storage device 100 in which embodiments of the present invention are useful. Device 100 includes a plurality of discs 102 rotationally coupled to a base chassis 104 via a spindle motor (not shown) as illustrated by arrow 106. Heads (such as for example, magnetoresistive, magneto-optical or inductive heads) are coupled to an actuator assembly 110 to position the heads 108 to read data from or write data to the discs 102.

In the embodiment shown, the actuator assembly 110 includes an actuator 112 which is rotated via operation of a voice coil motor (VCM) 114 to move the head 108 as illustrated by arrow 116 relative to selected tracks on the disc 102 based upon commands or signals from a host computer or system 118 (illustrated schematically). In the embodiment shown, the head 108 is coupled to the actuator 112 via a head suspension assembly 120 and a gimbal spring (not shown) to allow the head 108 to pitch and roll to follow the topography of the disc surface. Rotation of the disc creates an air flow along an air bearing slider 130 of the head to provide a lifting force which is countered by a load force of the suspension assembly 120 to define in part a fly height of the head 108 or slider 130.

Figure 2:
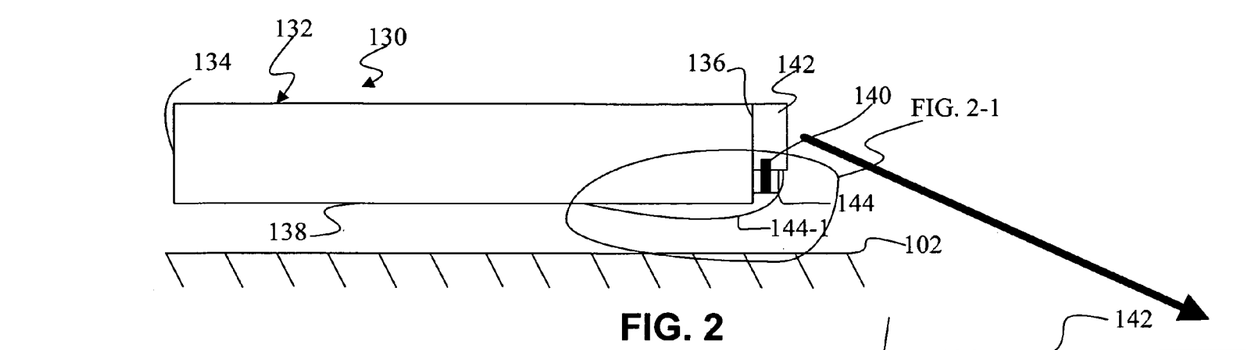
Figure 21:
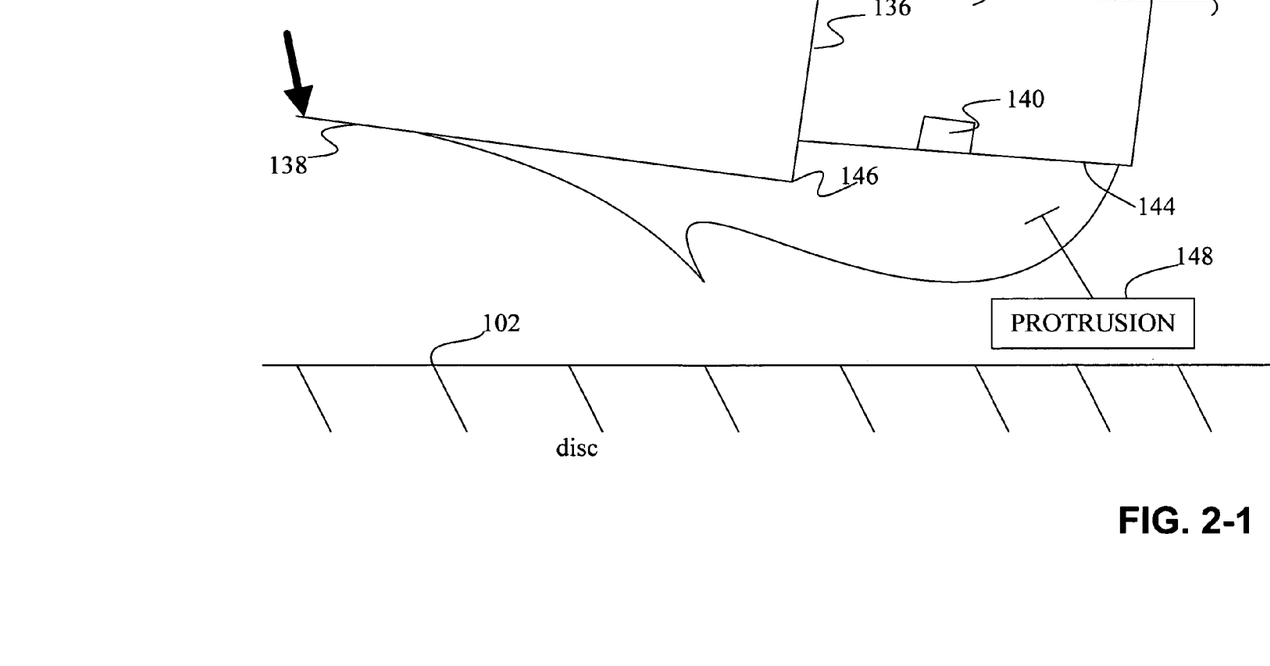

FIG. 2 illustrates an embodiment of an air bearing slider including a slider body 132, a leading edge 134, a trailing edge 136 and a raised air bearing surface or surfaces 138. Air flows along the raised bearing surface or surfaces 138 of the slider to provide a lifting force for read or write operations. As previously described, the suspension assembly 120 supplies a load force proximate to a load point about which the slider 130 pitches and rolls. In the embodiment shown, transducer elements 140 (illustrated schematically) are fabricated on a transducer portion 142 at the trailing edge of the slider for read write operations. In particular, transducer elements 140 are embedded in an Alumina $Al_2O_3$ or heat expandable substrate to form the transducer portion 142 of the head. As shown, a raised disc facing surface 144 of the transducer portion 142 is typically recessed (for example as a result of a lapping process) from the air bearing surface of the slider body and the slider typically flies at a pitch angle so that the trailing edge of the slider provides a close point 146 of the head relative to the disc surface. Raised bearing surfaces of the slider body and raised surface 144 of the transducer portion 142 are formed by known etching and milling steps. As shown in FIG. 2-1, thermal expansion of the transducer portion 142 can cause protrusion 148 (illustrated schematically) of the transducer elements (illustrated schematically) or portion 142.

Figure 3:
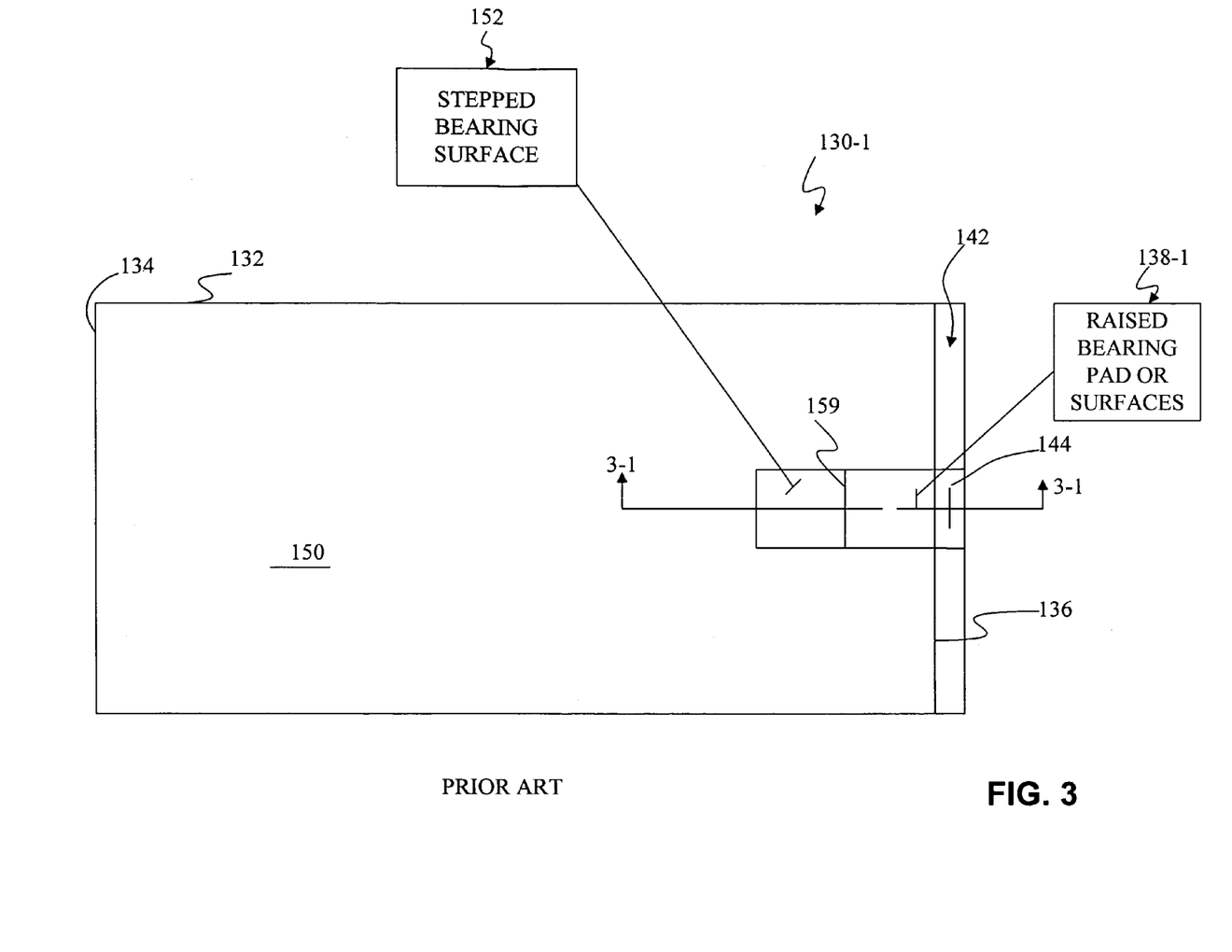
Figure 31:
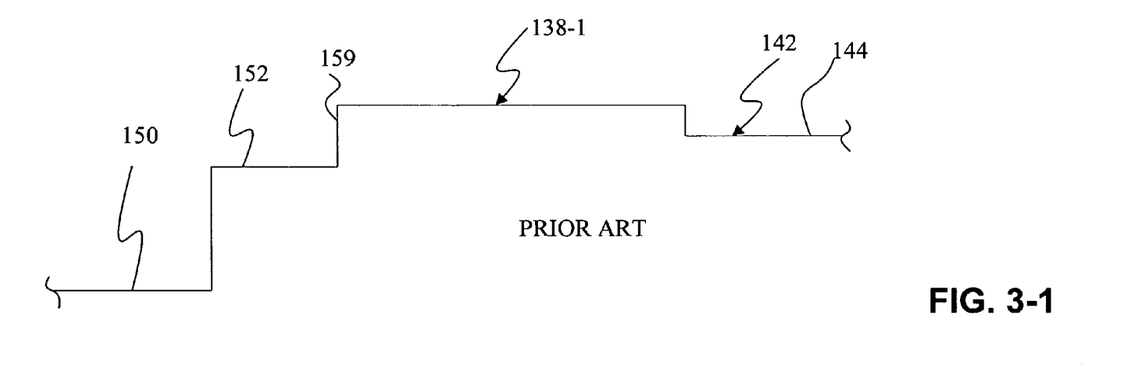
Figure 32:
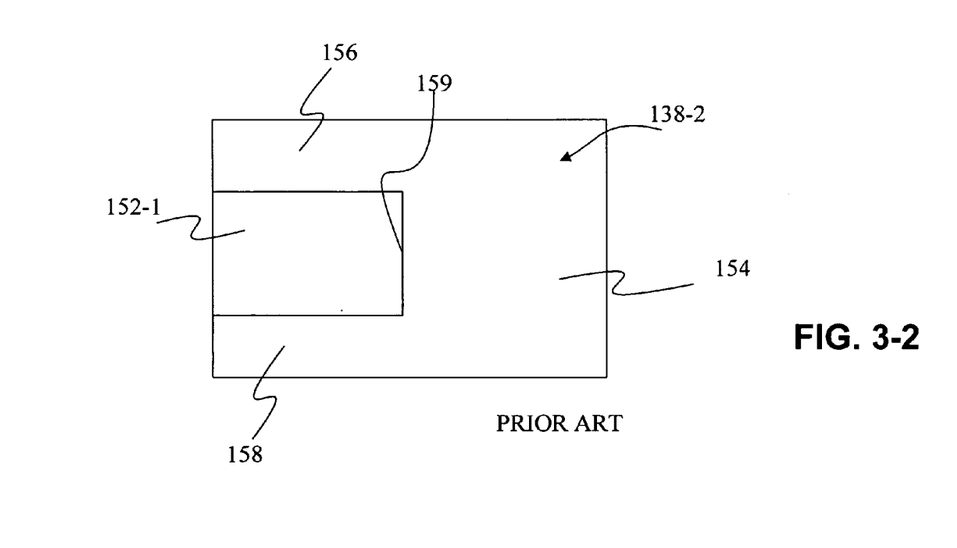

As shown in FIGS. 3, 3-1 and 3-2, prior air bearing sliders include raised bearing surface or surfaces 138-1 or 138-2 elevated above a recessed or milled surface or surfaces 150 proximate to the trailing edge of the slider. As shown, the bearing surface 138-1 or 138-2 is pressurized relative to a stepped bearing surface 152 or stepped channel 152-1 (FIG. 3-2) to maintain a stable fly height for the slider relative to the disc surface. In the embodiment illustrated in FIG. 3-2, the trailing edge bearing surface 138-2 includes a cross portion 154 and opposed side portions 156, 158 forming the raised bearing surfaces 138-2 about stepped channel 152-1. Stepped bearing surface 152 or channel 152-1 forms a bearing step 159 from the stepped surface to provide a pressure ramp to pressurize the raised bearing surfaces 138-1 or 138-2. Sliders are fabricated by known etching or milling processes. The raised bearing surfaces are formed at a substrate surface of the slider or transducer portion (0.0 mill depth) and the stepped bearing surfaces are typically recessed from or etched below the substrate a depth of 0.1-0.3 µm.

As previously discussed, the transducer portion 142 includes a heat expandable substrate or portions. During operation, the transducer portion or alumina layer can thermally expand for example, due to increase in the ambient drive temperature or heat generated by write current. Expansion of the transducer portion or alumina layer below the raised bearing surfaces of the slider or slider body can shift the close point of the head relative to the disc surface or increase head media contact. The present invention relates to an adaptable air bearing design to compensate for thermal expansion of the transducer or pole tip protrusion.

Figure 4:
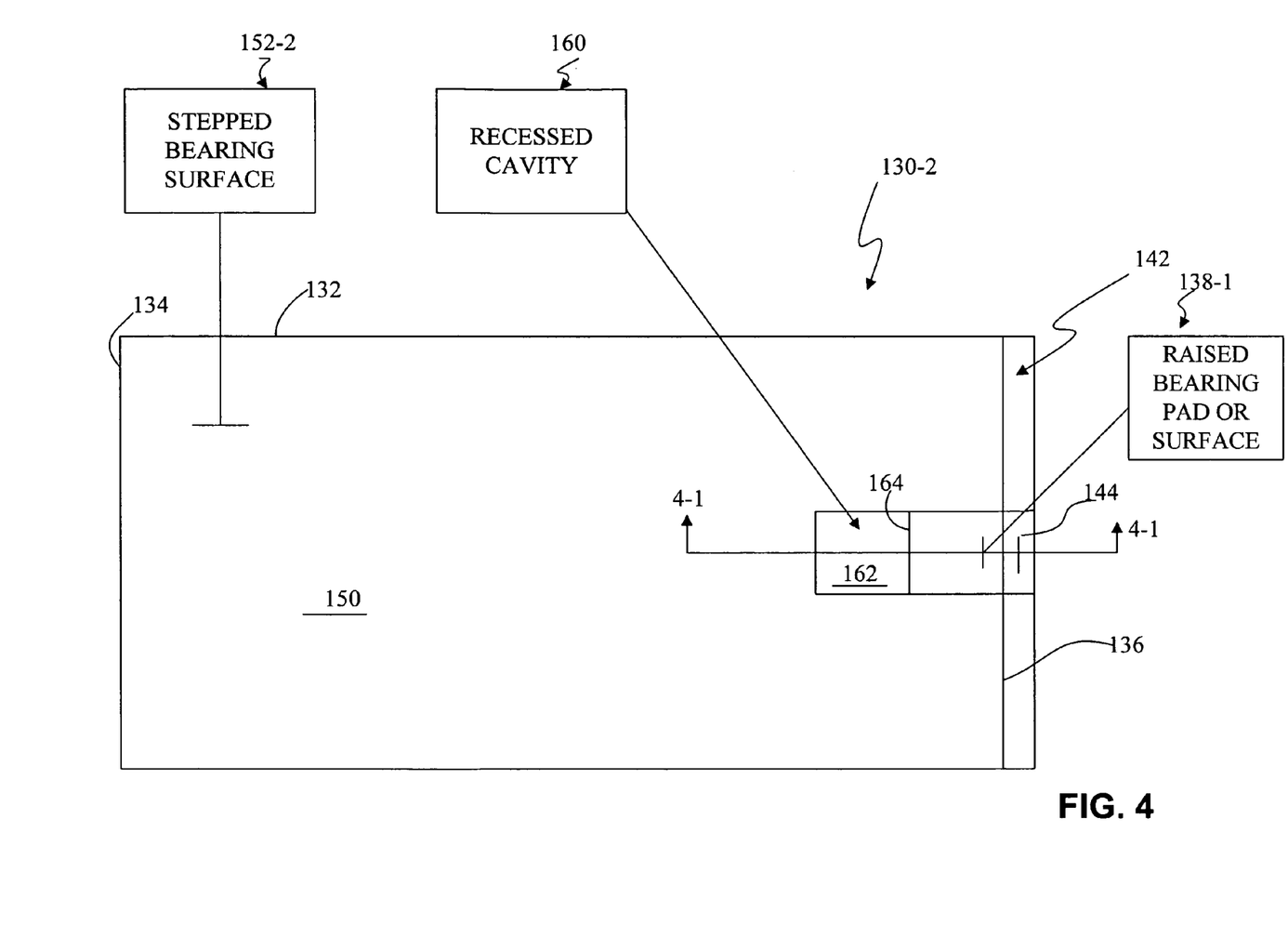
Figure 41:
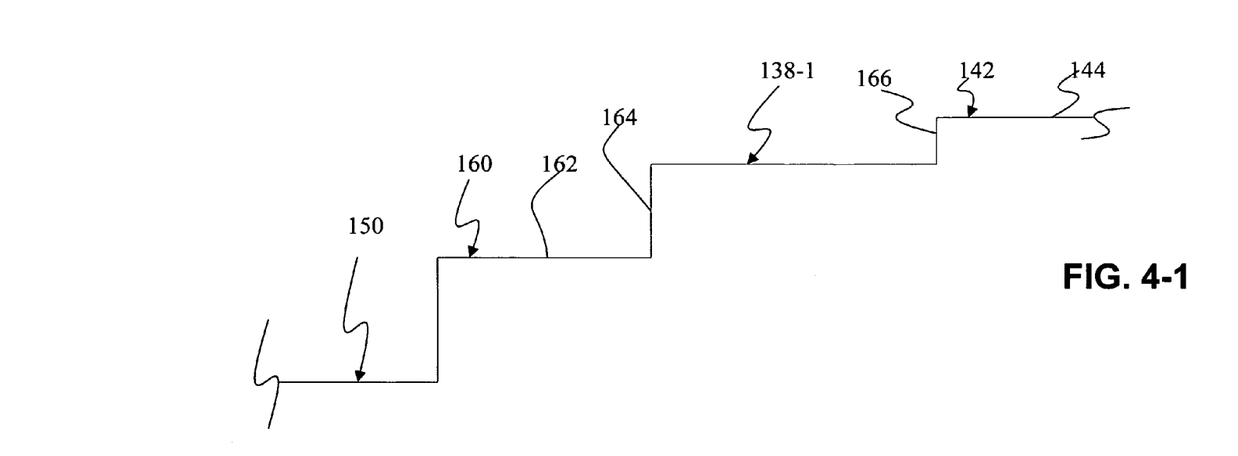
Figure 42:
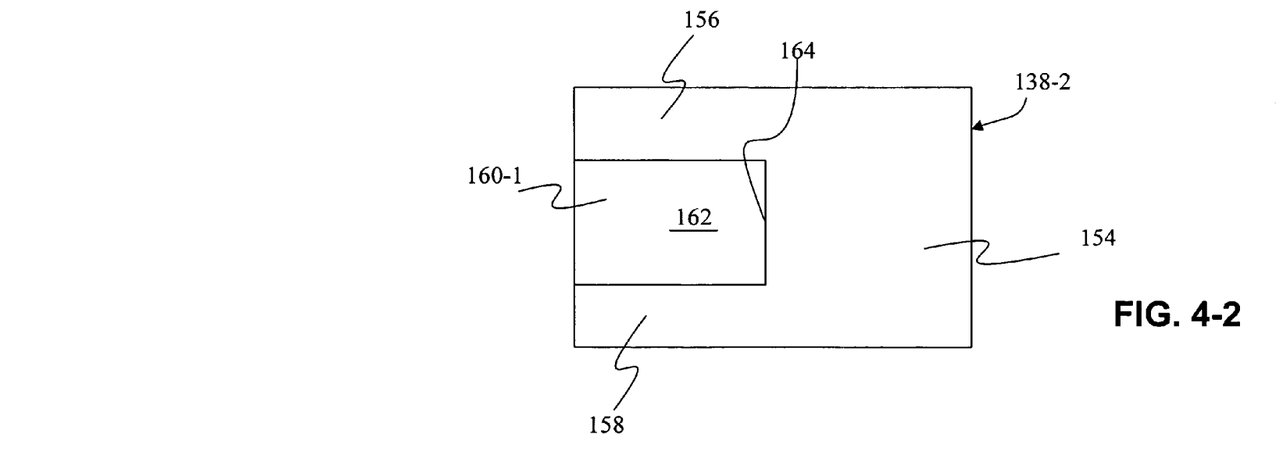

FIGS. 4, 4-1 and 4-2 illustrate an embodiment of the adaptable air bearing slider 130-2 where like numbers are used to identify like parts in the previous FIGS. As shown, slider 130-2 includes a recessed cavity 160 or cavity channel 160-1 having a recessed cavity surface 162 recessed below the stepped bearing surface or surfaces 152-2 of the slider or prior art. The cavity 160 or cavity channel 160-1 is positioned proximate to the trailing edge bearing surface 138-1 or 138-2 to provide a leading edge cavity step 164 to the raised bearing surface or surfaces proximate to the trailing edge of the slider. The recessed cavity 160 or cavity channel 160-1 is milled or etched to a depth≧1.0 µm or between 2.0-3.0 µm (e.g. preferably approximately 2.4 µm).

The cavity surface 162 provides a rampless interface to the raised bearing surfaces 138-1 or 138-2 for read or write operations and the raised bearing surface or surfaces 138-1 or 138-2 provide an adaptable pressure step or ramp 166 to pressurize an expanded disc facing surface 144 of the transducer portion to compensate for thermal expansion of the transducer portion as illustrated in FIG. 4-1. Although FIGS. 4, 4-1 and 4-2 schematically illustrate embodiments of an adaptable slider, application is not limited to any particular design therefor. In particular, raised bearing surfaces and the leading edge cavity step 164 therefor can be formed along opposed sides rails having a trailing edge proximate to the trailing edge of the slider.

Figure 5:
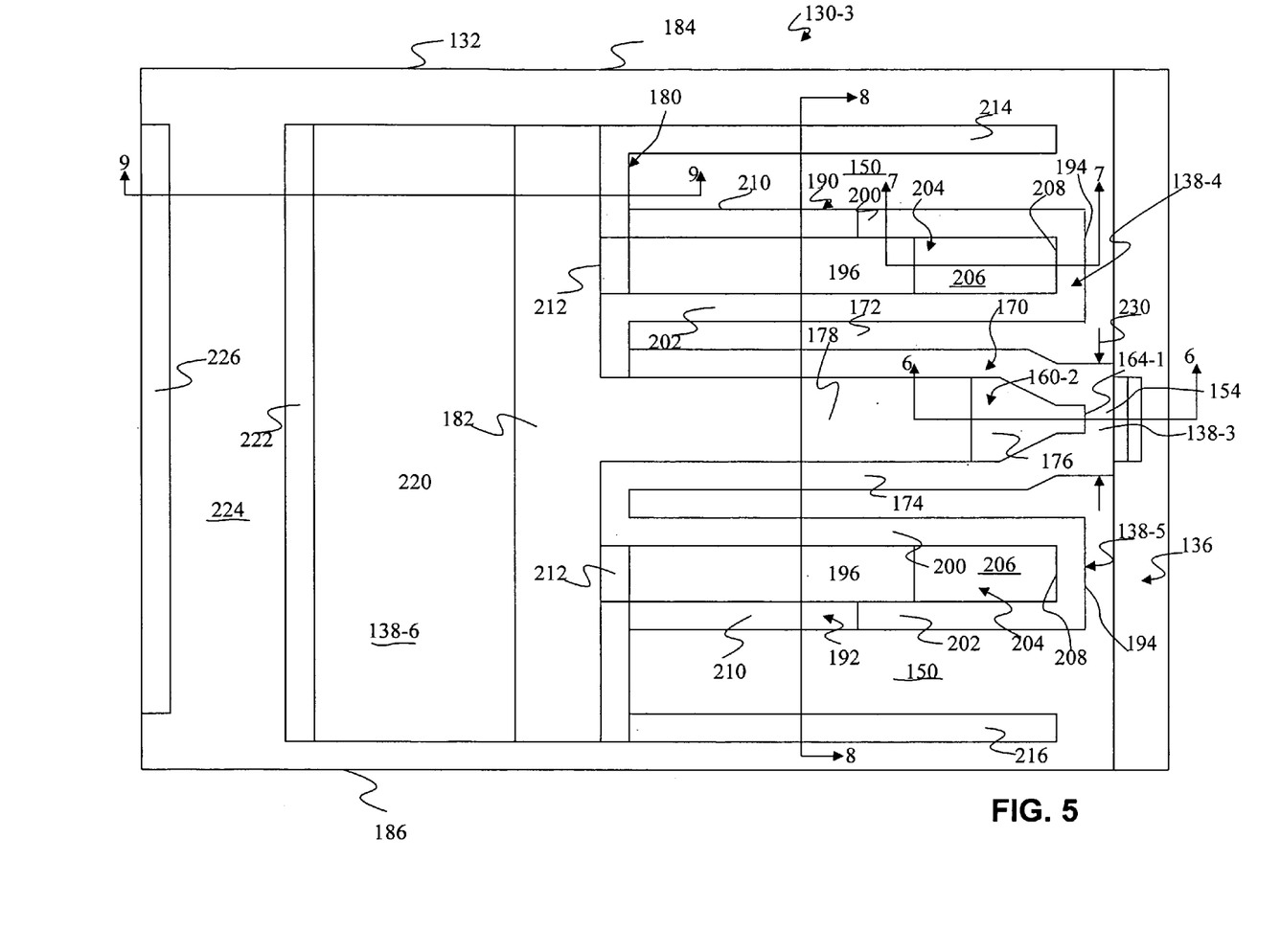
FIGS. 5-9 illustrate an embodiment of an adaptable air bearing slider of the present invention.
Figure 6:
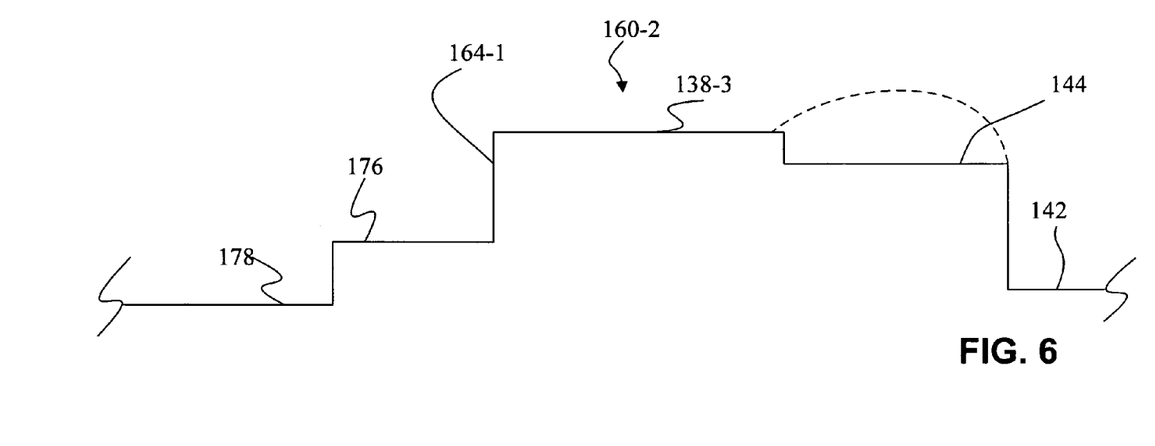

FIGS. 5-9 illustrate an embodiment of an air bearing slider 130-3 including a rail 170 having a raised bearing surface 138-3 proximate to the trailing edge of the slider. The rail 170 includes a convergent cavity channel 160-2 formed between raised rail portion 172, 174 elevated above a recessed or milled surface 150 to form opposed side portions and a cross portion about convergent cavity channel 160-2. The convergent cavity channel 160-2 forms a leading edge cavity step 164-1 as illustrated in FIG. 6 to the raised bearing surface or surfaces 138-3 proximate to a trailing edge of the rail 170. As shown, cavity channel 160-2 includes a first recessed cavity depth portion 176 proximate to the trailing edge and a deep recessed cavity depth portion 178 extending from a transverse cavity dam 180. In the embodiment shown, the slider 130-3 includes a cross trench 182. The cross trench 182 has a cross channel dimension extending generally between opposed sides 184, 186 of the slider to provide air flow to the convergent cavity channel 160-2 or raised bearing surfaces.

In an illustrated embodiment, the first recessed cavity depth portion 176 has a milled or etched depth≧1.0 µm or between 2.0-3.0 µm (e.g. preferably approximately 2.4 µm) to form the cavity step 164-1 to the raised bearing surface or surfaces 138-3. The deep recessed cavity depth portion 178 has a milled or etched depth greater than or equal to 4.0 µm. In a preferred embodiment, cross channel or trench 182 is milled or etched to a recessed depth greater than or equal to 4.0 µm to provide deep flow passages for air flow along the rail 170 to the raised bearing surface or surfaces.

Thus as described, the cavity step 164-1 forms a rampless air bearing surface or surfaces proximate to the trailing edge of the slider in contrast to prior air bearing sliders including a stepped interface to the raised bearing surface or surfaces proximate to the trailing edge of the slider. The raised bearing surface or surfaces 138-3 and leading edge cavity step 164-1 provide an adaptive ramp or stepped surface for a protruding surface or portion 148 of the transducer portion to pressurize the protruding surface 148 to provide a relatively stable fly height for the slider as previously described.

Figure 7:
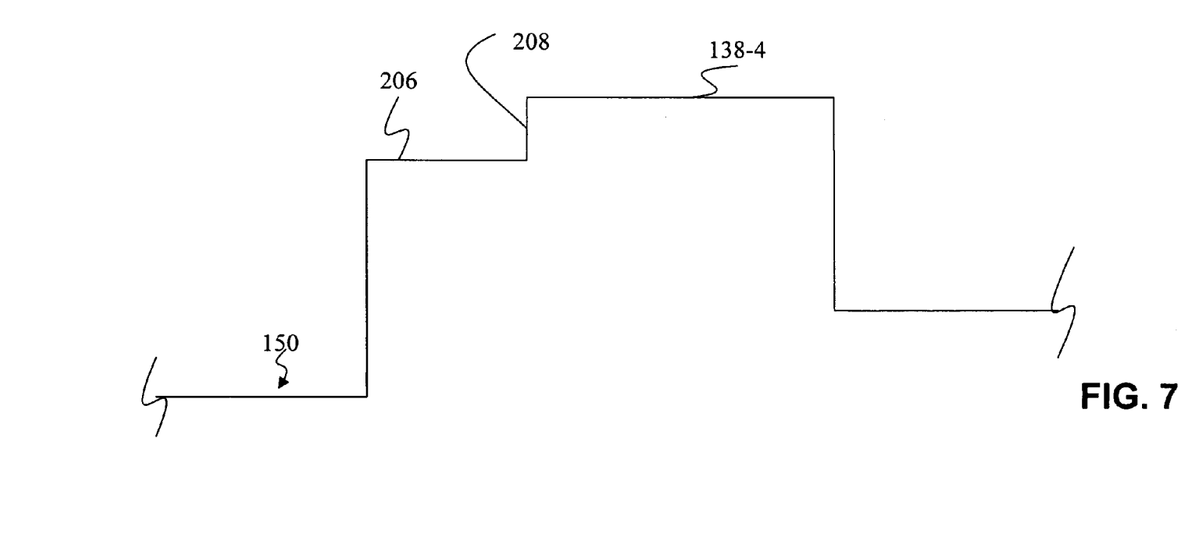
Figure 8:
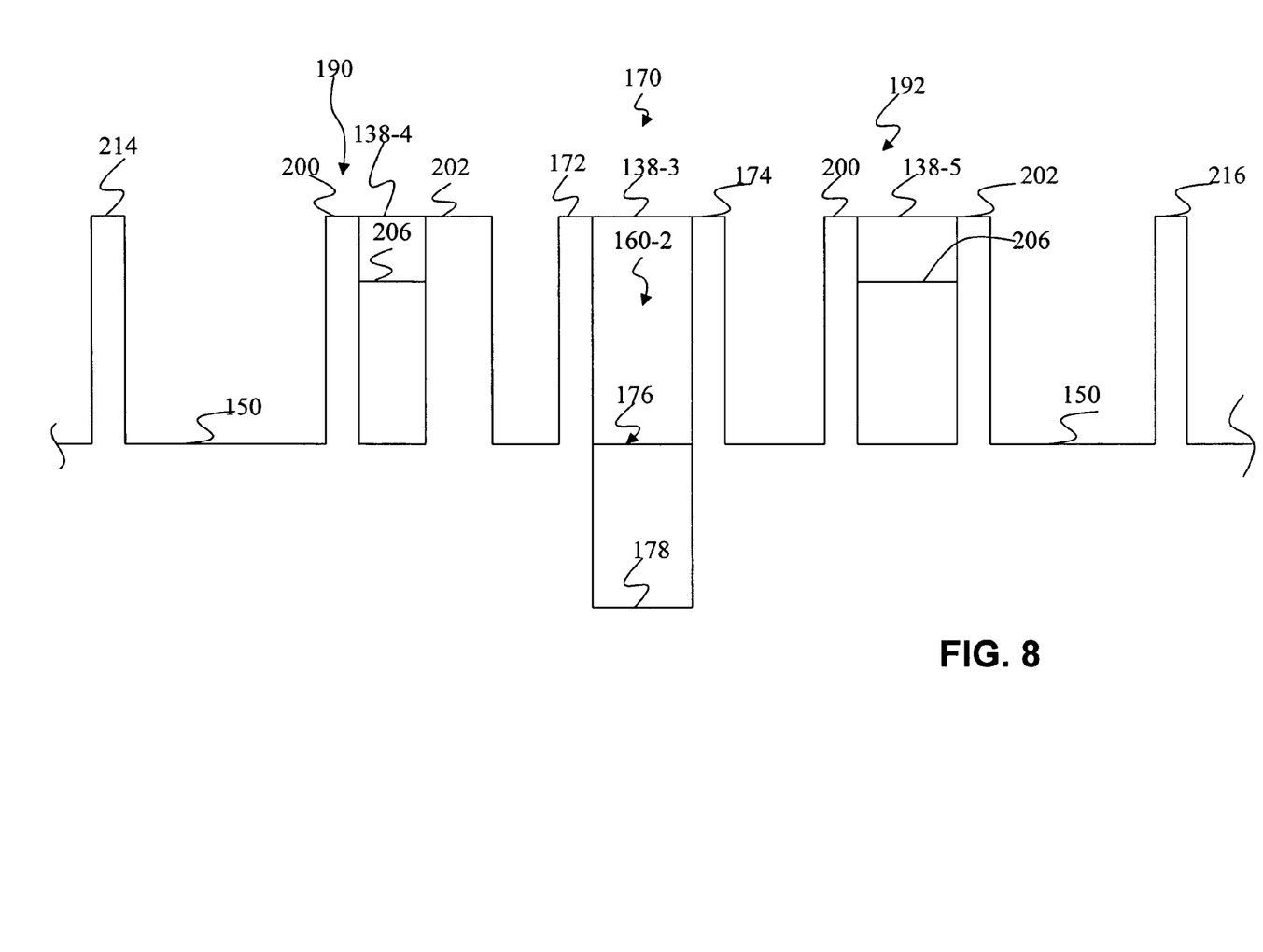
Figure 9:
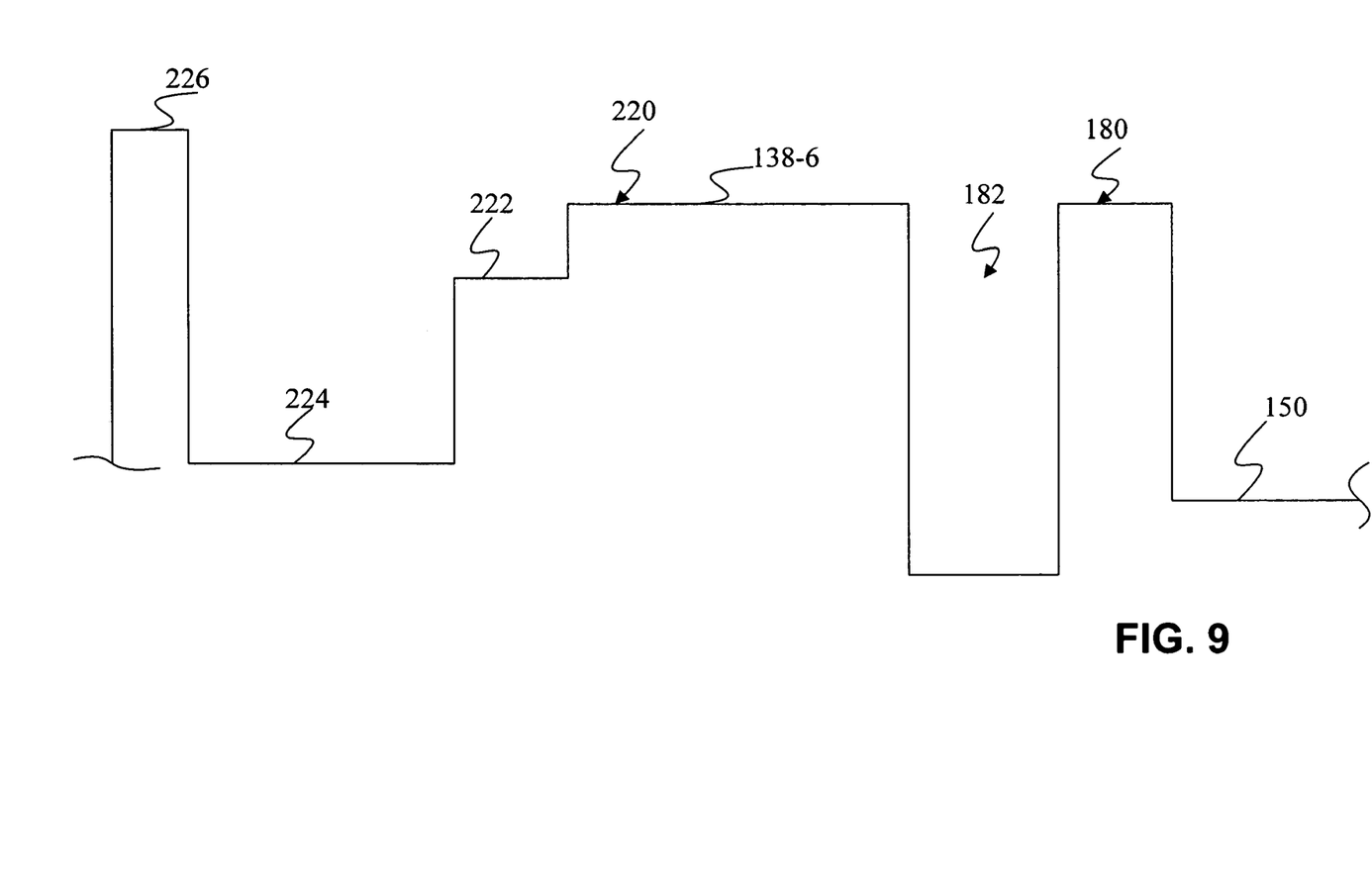

As shown in FIGS. 5 and 7, the slider includes opposed rails 190, 192 having a trailing edge 194 recessed or spaced from the trailing edge of the slider. Recessed rails 190, 192 are spaced from rail 170 proximate to a center portion or dynamic axis of the slider. The recessed rails 190, 192 include a channel 196 formed between raised rail portions 200, 202 elevated above the recessed or milled surface 150. The channel 196 has a stepped channel portion 204 forming a stepped bearing surface 206 proximate to raised bearing surfaces 138-4, 138-5 at the trailing edge 194 of the rails 190, 192. The stepped bearing surface 206 provides a bearing step 208 or ramp to pressurize the raised bearing surfaces 138-4 or 138-5 as shown in FIGS. 7-8. Rail portions 200 having stepped surface 210 along a portion of a length thereof and a stepped leading edge 212 to provide a stepped inlet for air to channel 196. The slider includes opposed stepped rails 214 and 216 on opposed sides 184, 186 of the slider to contain air for pressurization.

Cross channel or trench 182 is formed between a leading edge bearing pad 220 and the cavity dam 180. The leading edge bearing pad 220 includes a stepped surface 222 elevated above a recessed surface 224 disposed between the leading edge bearing pad 220 and a leading edge cavity dam 226 and a raised bearing surface 138-6. The slider illustrated in the FIGS. 5-9 is fabricated using known masking, etching or milling processes. In particular, the stepped surfaces, recessed surfaces and deep recessed surface are fabricated using multiple masking steps to form the raised and stepped bearing surfaces shown.

Figure 10:
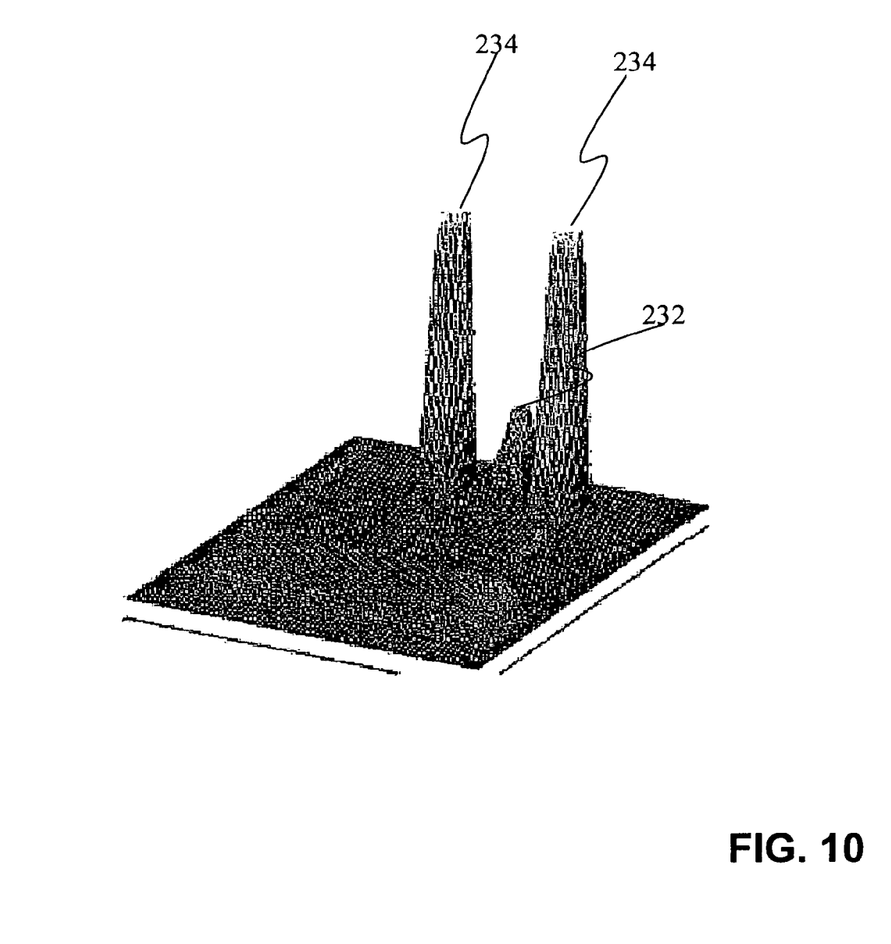
FIGS. 10-11 comparatively illustrate pressure profiles for an embodiment of an adaptable air bearing slider of the present invention.

In the illustrated embodiment, the cavity channel 160-2 proximate to the trailing edge bearing surface or surfaces reduces contact surface area proximate to the trailing edge to reduce tipping stiction for contact starts and stops. In the embodiment shown, rail 170 has a tapered trailing edge cross profile 230 (as shown in FIG. 5) to provide a narrow cross width dimension to limit tipping stiction. As shown in FIG. 10, the cavity channel 160-2 provides a smaller total positive pressure 232 for the raised bearing surface or surfaces proximate to the trailing edge of the slider. Recessed rails 190, 192 are positioned closer to a center portion or dynamic axis of the slider to provide relatively high total positive pressure or profile 234 relative to a cross width dimension of the transducer elements to provide sufficient fly height for the slider. Thus as shown, the raised bearing surface or surfaces proximate to the trailing edge provides a relatively small pressure profile which reduces pole or transducer recession sensitivity and recessed or spaced rails provide higher positive pressure or profiles to provide sufficient fly height for read or write operations.

Figure 11:
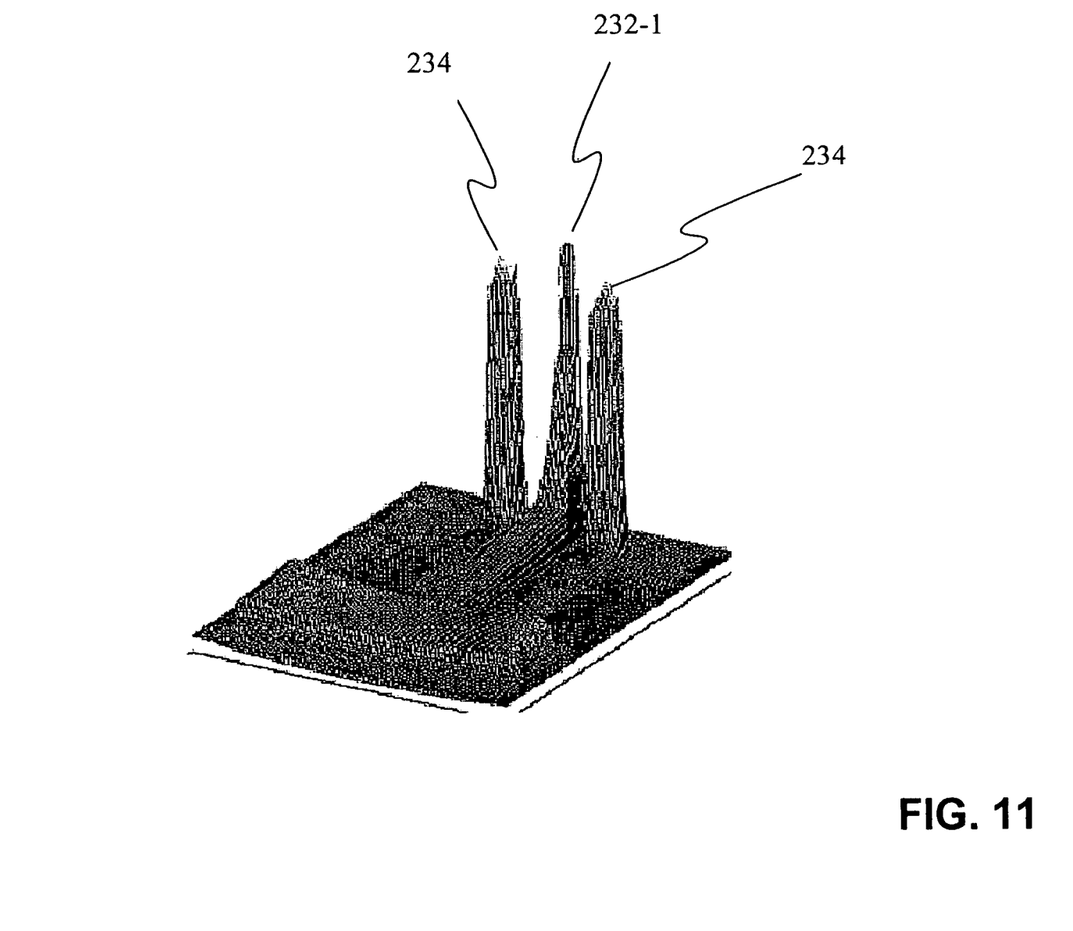

The smaller offset dimension or spacing of the rails 190, 192 relative to the center or dynamic axis of the slider reduces a cross profile dimension of the raised bearing surfaces to reduce cross curve sensitivity of the slider since cross curve sensitivity generally increases relative to a cross dimension of the raised bearing surfaces. As shown comparatively in FIG. 11, expansion of the transducer portion or pole tip protrusion provides an increased total positive pressure or profile 232-1 proximate to the trailing edge via pressurization of the expanded or protruding surface relative to the adaptive bearing surface to compensate for transducer or pole tip expansion or protrusion caused by thermal expansion of the transducer region or portion.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device or system, it will be appreciated by those skilled in the art that the teachings of the present invention can be applied to other data storage devices, without departing from the scope and spirit of the present invention.

What is claimed is:

1. An air bearing slider comprising:
   a slider body, a leading edge, a trailing edge and at least one raised bearing surface proximate to the trailing edge and at least one stepped bearing surface spaced from the trailing edge and recessed below the at least raised bearing surface; and
   a first recessed cavity surface recessed below the at least one raised bearing surface and the at least one stepped bearing surface and a leading edge cavity step from the first recessed cavity surface to the at least one raised bearing surface and a cavity step from a second cavity surface to the first recessed cavity surface.

2. The air bearing slider of claim 1 wherein the first cavity surface is recessed a depth greater than approximately 1.0 μm below the at least one raised bearing surface.

3. The air bearing slider of claim 1 wherein the first cavity surface has a recessed depth greater than or equal to 2.0 μm and the stepped bearing surface is recessed less than or equal to 0.5 μm from the at least one raised bearing surface.

4. The air bearing slider of claim 1 wherein the first cavity surface is recessed a depth greater than approximately 2.0 μm below the at least one raised bearing surface and the at least one stepped bearing surface is recessed approximately 0.1-0.3 μm below the at least one raised bearing surface.

5. The air bearing slider of claim 1 wherein the at least one raised bearing surface includes a raised bearing rail having a convergent channel formed therealong between opposed rail portions and the convergent channel includes the first recessed cavity surface proximate to a trailing edge of the raised bearing rail to form the leading edge cavity step from the first recessed cavity surface to the at least one raised bearing surface.

6. The air bearing slider of claim 5 wherein the convergent channel includes multiple recessed cavity surface depths along the raised bearing rail including a first channel or milled depth below a stepped depth of the at least one stepped bearing surface to form the first recessed cavity surface and a second channel or milled depth below the first channel or milled depth to form the second recessed cavity surface.

7. The air bearing slider of claim 6 wherein the first channel or milled depth is approximately 4.0 μm or greater and the second channel or milled depth is less than 4.0 μm and the second channel or milled depth forms the leading edge cavity step to the at least one raised bearing surface.

8. The air bearing slider of claim 1 including opposed rails having a trailing edge spaced from the trailing edge of the slider and having a stepped channel having a stepped bearing surface formed therealong to define leading edge bearing steps from the stepped bearing surfaces to the raised bearing surfaces of the opposed rails.

9. The air bearing slider of claim 5 including a cross channel formed between a leading edge bearing pad and a cavity dam and extending between opposed sides of the slider.

10. The air bearing slider of claim 1 and further comprising opposed stepped cavity dam rails extending along a length of the slider between the leading and trailing edges of the slider.

11. The air bearing slider of claim 1 wherein the at least one raised bearing surface includes opposed raised side portions and a raised cross portion to form a convergent channel cavity including the first recessed cavity surface and the leading edge cavity step extends from the first recessed cavity surface of the convergent channel cavity to the raised cross portion.

12. An air bearing slider comprising:
    a slider body, a leading edge, a trailing edge and at least one raised bearing surface proximate to the trailing edge having a cross portion and opposed side portions each elevated above a stepped bearing surface and including a cavity channel between the opposed side portions having a recessed cavity surface recessed from the at least one raised bearing surface and the stepped bearing surface and a leading edge cavity step from the recessed cavity surface to the at least one raised bearing surface proximate to the trailing edge of the slider.

13. The air bearing slider of claim 12 wherein the stepped bearing surface forms a bearing step having a step height of approximately less than 0.5 μm.

14. The air bearing slider of claim 12 wherein the cavity channel is formed along a center rail having an elongate length to form the leading edge cavity step to the at least one raised bearing surface proximate to a trailing edge of the center rail.

15. The air bearing slider of claim 14 wherein the center rail includes opposed rail portions extending from a transverse cavity dam and forming the at least one raised bearing surface proximate to the trailing edge of the slider.

16. The air bearing slider of claim 14 wherein the center rail includes a tapered rail profile proximate to the trailing edge of the slider.

17. The air bearing slider of claim 14 and including opposed rails having a trailing edge spaced from the trailing edge of the slider and the opposed rails having a raised rail surface and a stepped rail surface and including a leading edge step from the stepped rail surfaces to the raised rail surfaces of the opposed rails.

18. The air bearing slider of claim 17 wherein the opposed rails include a channel having a recessed channel surface recessed below the stepped rail surface.

19. The air bearing slider of claim 18 wherein the opposed rails include a stepped inlet to the channel.

20. The air bearing slider of claim 14 and further including stepped cavity dam rails proximate to opposed sides of the slider having a stepped rail surface recessed below the at least one raised bearing surface.

* * * * *